United States Patent [19]
Chambers

[11] Patent Number: 5,699,425
[45] Date of Patent: Dec. 16, 1997

[54] TELEPHONE HAND SET SECURITY DEVICE

[76] Inventor: Eric E. Chambers, 31 Pender Cres., Scarborough, Ontario, Canada, M1T 2M8

[21] Appl. No.: 696,530

[22] Filed: Aug. 14, 1996

[51] Int. Cl.[6] .................................................. H04M 1/00
[52] U.S. Cl. ....................... 379/437; 379/437; 379/445; 379/451
[58] Field of Search ...................... 379/445, 437, 379/451, 446, 448, 455, 440; D14/142, 151, 141, 250, 251, 252, 257

[56] References Cited

U.S. PATENT DOCUMENTS

| | | |
|---|---|---|
| 1,424,863 | 8/1922 | Walker et al. . |
| 3,899,647 | 8/1975 | Nachsi et al. . |
| 3,965,310 | 6/1976 | Willy . |
| 4,081,630 | 3/1978 | Washburn et al. . |
| 4,204,097 | 5/1980 | Schmit . |
| 4,396,810 | 8/1983 | Cover . |
| 5,181,242 | 1/1993 | Stack . |

*Primary Examiner*—Dwayne Bost
*Assistant Examiner*—Keith Ferguson
*Attorney, Agent, or Firm*—Merek & Voorhees

[57] ABSTRACT

A device for limiting unauthorized access to a telephone hand set. The device comprises a cabinet for receiving and holding a telephone hand set. The cabinet has an enclosed bottom, enclosed sides and an open top. A removable cover is received into the upper portion of the cabinet and has an open and a closed position. When in its closed position the cover seals the open top of the cabinet to enclose and limit access to the key pad of the telephone hand set while providing unlimited access to the receiver. When in its open position the cover provides unobstructed access to the telephone hand set. The cover allows for the activation of pre-determined keys on the key pad of the telephone hand set when the cover is in its closed position. A lock secures the cover in its closed position.

13 Claims, 5 Drawing Sheets

TELEPHONE HAND SET SECURITY DEVICE

FIELD OF THE INVENTION

This invention relates to devices used to limit unauthorized access to a telephone hand set, and in particular a form of telephone hand set security device that allows for the receipt of in-coming calls but the placement of only pre-determined out-going calls.

BACKGROUND OF THE INVENTION

The unauthorized use of telephones is a significant problem faced by many individuals and businesses. Not only does the unauthorized use of a telephone tie up the telephone line preventing legitimate use of that line, but long distance charges related to unauthorized telephone calls can be a source of considerable expense. In some cases the unauthorized use of telephones occurs at night when phone systems are rarely monitored, or upon phones located in remote areas of an office, factory or warehouse. Telephones in reception and waiting areas can also present problems. It may also be the case in some households that the unauthorized use of a telephone by family members, and particularly younger family members, can result in very significant and unexpected long distance charges.

To combat this problem and reduce the expense of fraudulent and unauthorized use of a telephone, others have proposed a variety of different locking devices that secure around a telephone key pad to prevent the dialing of numbers. While such devices are successful to varying degrees, they suffer from the inherent limitation of also preventing emergency use of the phone. For example, where a telephone that is located in a remote portion of a manufacturing facility has been the subject of unauthorized use, such prior art devices could be installed over the telephone key pad to prevent individuals from making unauthorized long distance calls. However, in the event of a fire, medical or other emergency, those devices also eliminate the ability to use the telephone to call for help.

SUMMARY OF THE INVENTION

The invention therefore provides a telephone hand set security device that overcomes these limitations in the prior art by providing a cabinet with a removable cover for purposes of receiving and holding a telephone hand set. The cover includes dialling means to allow for the activation of a pre-determined series of keys on the telephone key pad while the cover is in a closed position, thereby preventing unauthorized use of the hand set while still allowing for the dialling of an emergency or other number.

Accordingly, in one of its aspects the invention provides a device for limiting unauthorized access to a telephone hand set, the device comprising a cabinet for receiving and holding said telephone hand set therein, said cabinet having an enclosed bottom, enclosed sides and an open top; a removable cover, said cover received into the upper portion of said cabinet, said cover having an open and a closed position, when in said closed position said cover sealing said open top of said cabinet to enclose and limit access to the key pad of said telephone hand set while providing unlimited access to the receiver of said telephone hand set, when in said open position said cover providing unobstructed access to said telephone hand set; and, a lock to secure said cover in said closed position, said cover including dialling means to allow for the activation of pre-determined keys on said key pad of said telephone hand set while said cover is in said closed position.

Further objects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
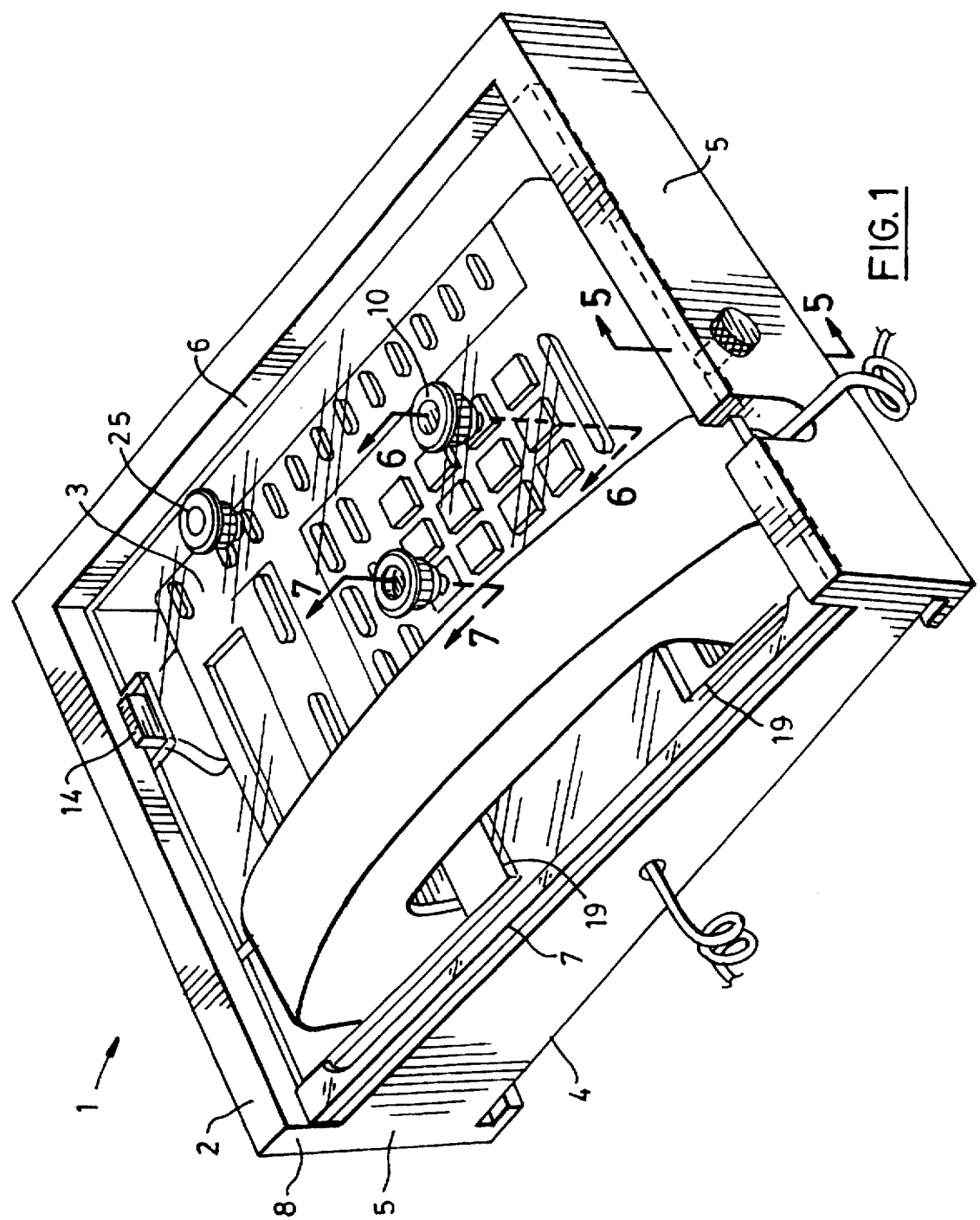
FIG. 1 is a top perspective view of the telephone hand set security device of the present invention with its cover in a closed position.
Figure 2:
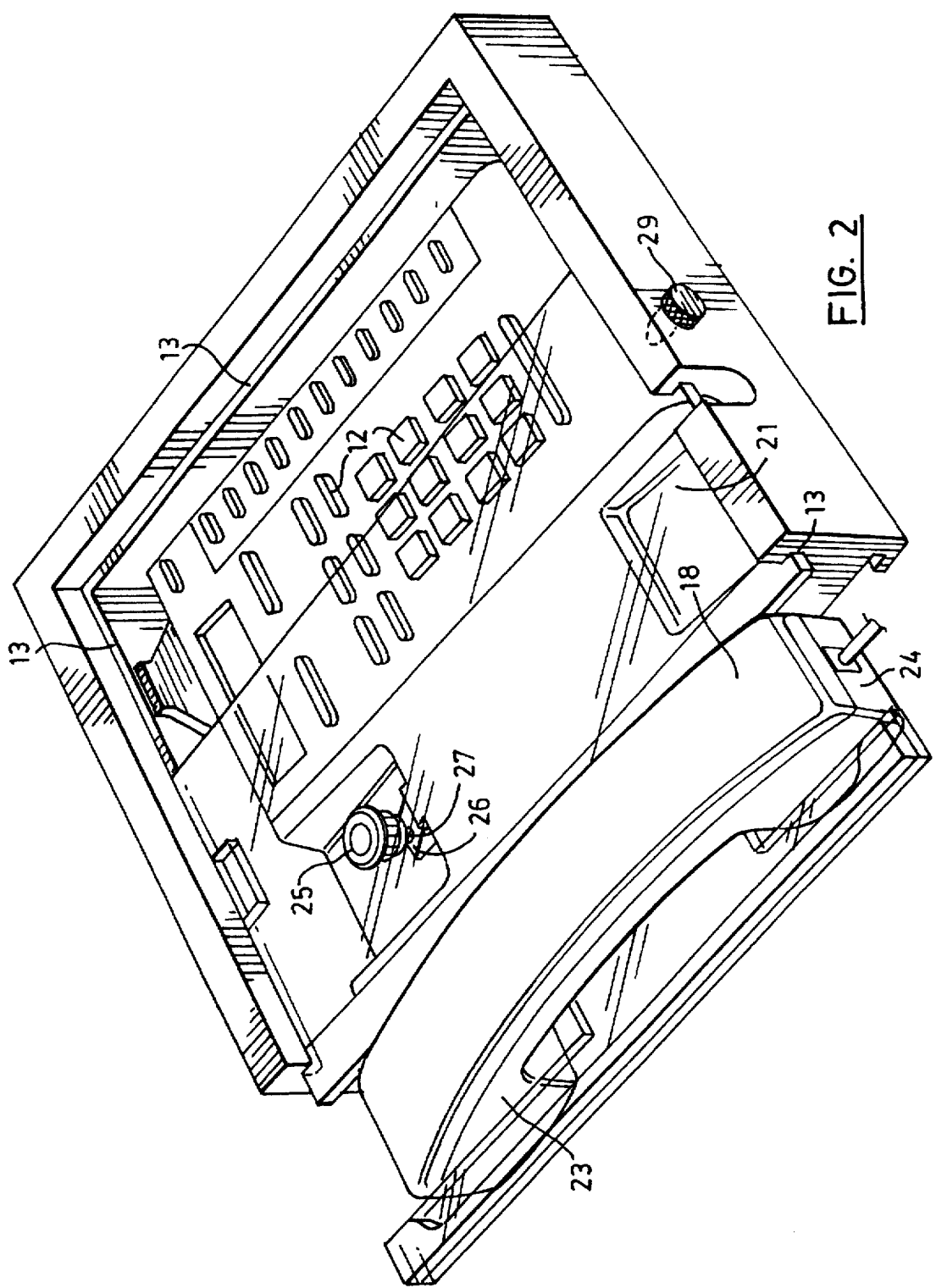
FIG. 2 is a top perspective view of the device of FIG. 1 with its cover in an open position and the telephone receiver supported by the cover independently from the telephone cradle.

The telephone hand set security device of the present invention is noted generally in the attached Figures by the reference numeral 1. Device 1 comprises, in general, a cabinet 2 for receiving and holding a telephone hand set 3. Cabinet 2 has an enclosed bottom 4, enclosed sides 5 and an open top 6. As shown in FIGS. 1 and 2, a removable cover 7 is received into the upper portion 8 of cabinet 2. A series of slots 13, arranged around three sides of upper portion 8 of cabinet 2, serve to provide a means for slidably receiving cover 7 into cabinet 2. When cover 7 is fully received into upper portion 8 of cabinet 2, the cover provides a means to enclose open top 6. In this closed position slots 13 hold cover 7 securely along three of its four sides. It will be appreciated that through holding covering 7 in this fashion the cover will be secured within cabinet 2 preventing it from being lifted or pried off by unauthorized individuals.

Figure 4:
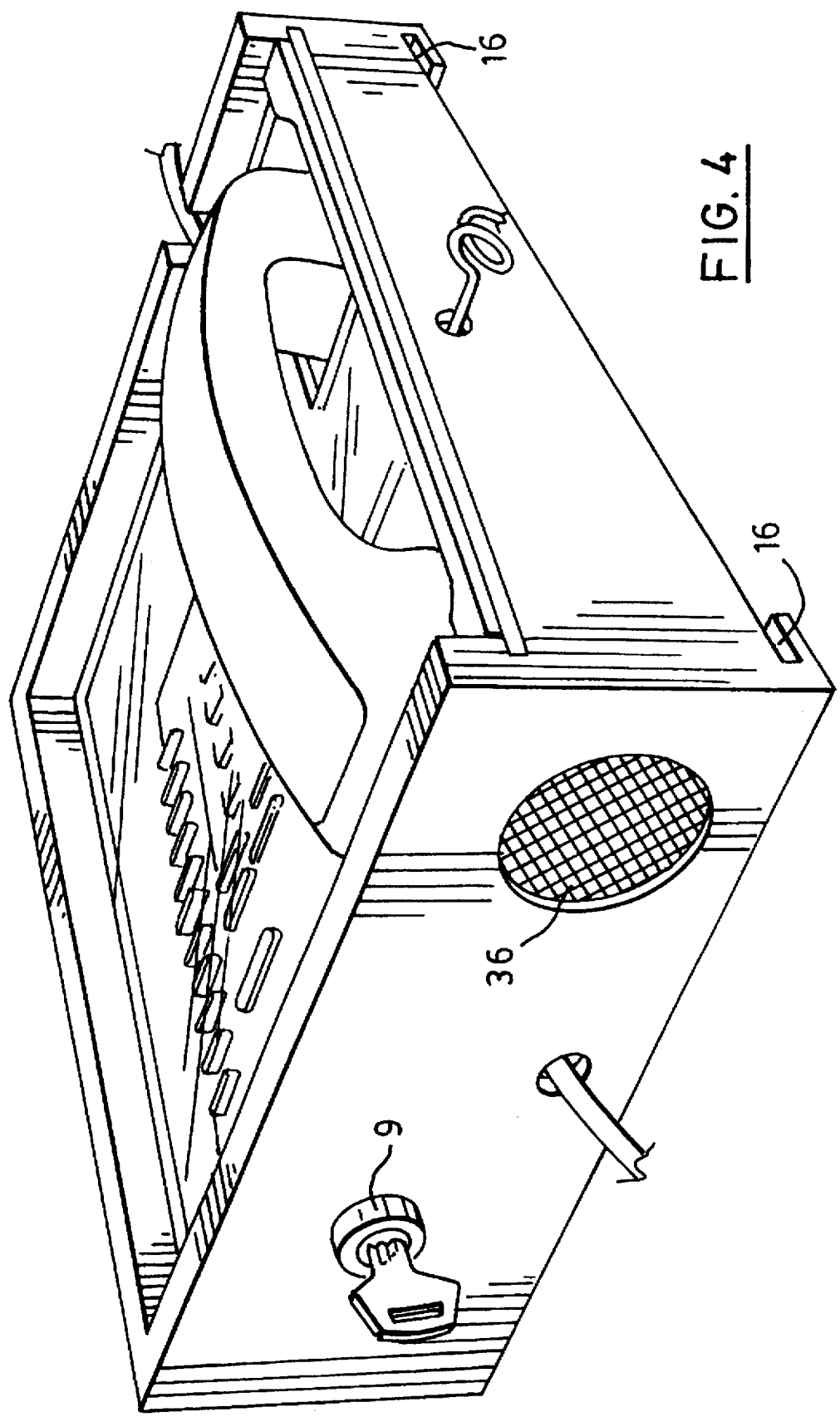
FIG. 4 is a rear perspective view of the device of FIG. 1.

To prevent the unauthorized removal of cover 7 from cabinet 2 through sliding it outwardly from slots 13, device 1 also includes a lock 9. Lock 9 is preferably mounted on one of the sides 5 of cabinet 2 and includes a moveable bolt 14 which engages a slot 15 in cover 7 to lock the cover in place. Preferably slot 15 is formed only slightly larger than bolt 14 in order to ensure a close fit between bolt 14 and slot 15. This reduces the ability for unauthorized individuals to tamper with the locking mechanism or insert a screw driver or other object between the bolt and slot in order to pry cover 7 from cabinet 2. As shown in FIG. 4, lock 9 is preferably key actuated.

To gain access to telephone hand set 3 when cover 7 is in its closed position, lock 9 is first disengaged to allow cover 7 to be freely slid from slots 13. At that point cover 7 may be removed completely from upper portion 8 and stored elsewhere. Cover 2 may also be stored in lower slots 16 positioned beneath enclosed bottom 4. Lower slots 16 therefore provide a means to hold and store cover 7 beneath cabinet 2.

While cover 7 can be completely removed from upper portion 8 of cabinet 2, it is expected that in most instances cover 7 will merely be slid outwardly from slots 13 to a sufficient degree to allow unobstructed access to telephone hand set 3. In this open position, cover 7 will be held partially within slots 13 and will partially over hang the side of cabinet 2 leaving the top of the cabinet directly above the keypad 12 of telephone hand set 3 open and unobstructed. To facilitate in sliding cover 7 inwardly and outwardly from cabinet 2, in the preferred embodiment cover 7 includes handle means 17 positioned along one side. Preferably handle means 17 comprises an upwardly extending ridge running along the side of the cover as shown more clearly in FIG. 3. However, it will be appreciated that a variety of other configurations of handles and or holes or perforations through cover 7 could be equally effective.

Referring again to FIG. 1, cover 7 is shown in its closed position wherein it seals or encloses open top 6 of cabinet 2 and thereby limits access to telephone hand set 3 by unauthorized individuals. When secured in place by lock 9, and except as described further herein, cover 7 will effectively prevent access to any of the keys 11 on keypad 12 and thereby prevent unauthorized individuals from making outgoing telephone calls.

Figure 3:
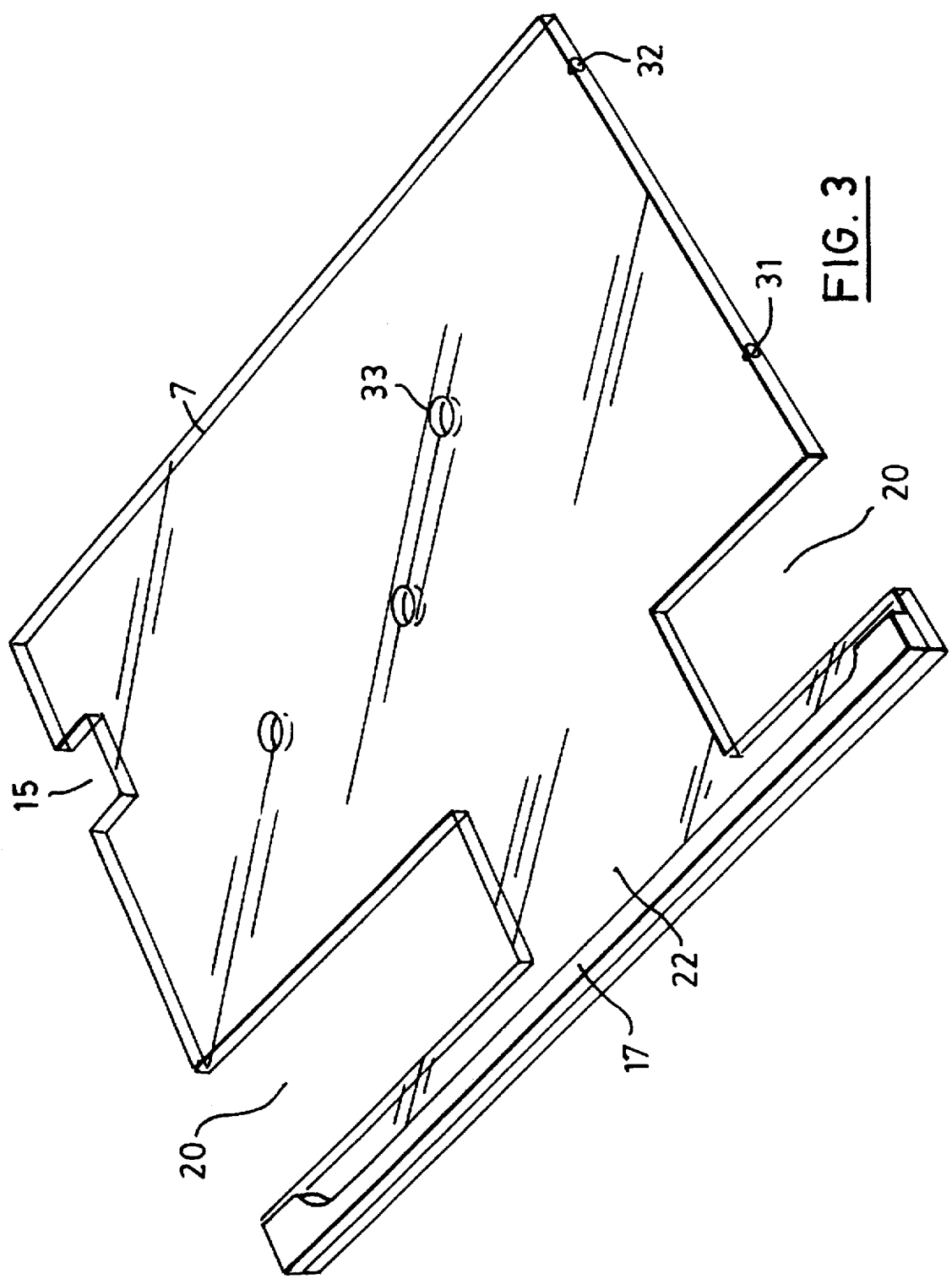
FIG. 3 is a top perspective view of the cover of the device shown in FIG. 1.

As shown in FIG. 1, in its closed position cover 7 provides unlimited access to receiver 18 of telephone hand set 3. This is accomplished thought the incorporation of means 19 into cover 7 that allow for the placement of receiver 8 in an on-hook or off-hook position without movement of the cover. Referring specifically to FIG. 1, 2 and 3, in the preferred embodiment means 19 comprises a pair of openings 20 through cover 7 which align with the cradle 21 of telephone hand set 3 when cover 7 is in its closed position. As shown, openings 20 are positioned at the top and bottom portion of cover 7 and are separated by a middle member 22. Openings 20 also generally conform in size to the size of the speaker portion 23 and the microphone portion 24 of telephone receiver 18. It will thus be appreciated that configuring openings 20 in this manner will allow for the normal operation of receiver 18 when cover 7 is in its closed position (see FIG. 1). That is, receiver 7 can be lifted from cradle 21 to place telephone hand set 3 in an off-hook position and then returned to cradle 21 to place telephone hand set 3 in an on-hook position without interference from cover 7. In this manner telephone hand set 3 can be used to receive in-coming calls in spite of cover 7 being in its closed position and locked in place.

In order to gain access to keypad 12, cover 7 must be unlocked and slid into its open position as described above and, as shown in FIG. 2. In its open position cover 7 partially over-hangs the side of cabinet 2 such that openings 20 are no longer in line with cradle 21. In this configuration openings 20, together with middle member 22, provide a means to support receiver 18 independently from telephone cradle 21. That is, the speaker portion 23 and the microphone portion 24 of receiver 18 can be placed within openings 20 such that receiver 18 is effectively hung over middle member 22 and supported in place. The rigidity of cover 7 and the fact that it remains partially retained within slots 13 also assist in holding receiver 18 firmly in place.

It will be appreciated that when cover 7 is in its open position and openings 20 no longer align with cradle 21, telephone hand set 3 would normally remain in its off-hook position. For that reason, cover 7 further includes a manually operable double activation plunger button 25 positioned therein. When cover 7 is in its open position button 25 aligns with the off-hook switch 26 of telephone hand set 3. Double activation plunger button 25 has a first and a second position such that when it is depressed once its internal plunger 27 is pushed downwardly and remains locked in a downward position. When button 25 is pushed a second time plunger 27 retracts upwardly and remains retracted until button 25 is pushed again.

In operation, double activation plunger button 25 is depressed once when cover 7 is in its open position to place and hold plunger 27 in a downward position. In its position, plunger 27 engages off-hook switch 26 and maintains telephone hand set 3 in an on-hook configuration. That is, double activation plunger 25 effectively "hangs up" the telephone by engaging the off-hook switch. Plunger button 25 will remain in this downward position until depressed a second time to release plunger 27. When plunger button 25 is depressed a second time plunger 27 is released and moved to its second, retracted position wherein it is retracted away from off-hook switch 26, thereby placing telephone hand set 3 in an off-hook status. The telephone will remain in this off-hook configuration until plunger button 25 is depressed again, causing plunger 27 to again engage off-hook switch 26. It will be appreciated that through depressing double activation plunger button 25 telephone hand set 3 can be changed from an on-hook to an off-hook position thereby allowing for the making of out-going calls without the necessity of returning receiver 18 to telephone cradle 21.

Figure 5:
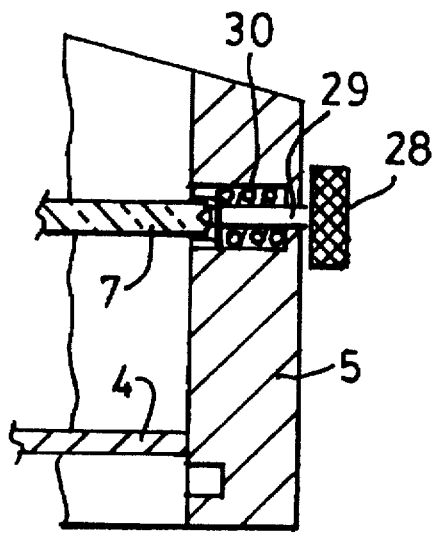
FIG. 5 is a sectional view taken along the line 5—5 of FIG. 1.

It will also be appreciated that in order for double activation plunger button to function properly it must be closely aligned with off-hook switch 26. For that reason cabinet 2 includes stops 28 that serve both to control the removal of cover 7 from cabinet 2 and to also allow for the simple and easy alignment of plunger button 25 with off-hook switch 26 when cover 7 is in its open position. In the preferred embodiment, and as shown in FIGS. 2, 3 and 5, stop 28 comprises a spring actuated plunger 29 mounted in the side of cabinet 2. Plunger 29 is inwardly biased by a spring 30 such that its end 31 extends through the side of cabinet 2 to engage a small hole or detent in the edge of cover 7. Preferably cover 7 contains two detents 31 and 32, each .physically positioned to align cover 7 in either its closed or open position. That is, when cover 7 is slid into its closed position plunger 29 of stop 28 is engaged within detent 31 to help secure the cover in place. In order to move cover 7 to its open position, plunger 28 is pulled outwardly from cabinet 2 such that it disengages detent 31 thereby allowing the cover to be slid outwardly from the cabinet. Once plunger 29 is clear of detent 31 it is released and cover 7 is withdrawn further from cabinet 2. As cover 7 is pulled outwardly from cabinet 2 plunger 29 will eventually align with second detent 32 and becomes engaged therein. At that point cover 7 is effectively held in place within slots 13 of cabinet 2 and cannot be slid inwardly or outwardly without disengaging plunger 29 from detent 32. With cover 7 now in its second or open position, double activation plunger button 25 will align with off-hook switch 26. It will therefore be appreciated that this structure will maintain the alignment of plunger button 25 with off-hook switch 26 until stop 28 is released to allow further movement of cover 7 inwardly or outwardly from cabinet 2.

With the function and operation of device 1 with cover 7 in its open position having been described, the operation of the present invention with cover 7 in its closed position will now be more completely explained. As discussed previously, when in its closed position cover 7 is preferably secured into place by means of slots 13 and lock 9. In this manner unauthorized individuals are prevented from making outgoing telephone calls. However, as also described previously, unlimited access to telephone receiver 18 is provided to allow for the answering of in-coming calls.

To increase the versatility of device 1 when cover 7 is in its closed position cover 7 further includes dialling means 10 to allow for the activation of pre-determined keys on keypad 12. As shown in FIG. 3, dialling means 10 may comprise holes 33 through cover 7 that aligned with particular keys when cover 7 is in its closed position. Since both lock 9 and stop 28 hold and secure cover 7 in its closed position they also help to maintain the alignment of holes 33 with particular pre-determined keys 11. The size of holes 33 are also such that they are large enough for the insertion of an operator's finger so that only a single key on keypad 12 can be activated.

The number of holes 33 through cover 7 and the particular keys with which they are aligned can be customized to any particular application. For example, to allow for the making of an emergency call holes permitting the dialling of emergency response numbers for police, fire department, ambulance, etc. (for example 9-1-1) may be provided. In other instances emergency numbers or other pre-determined telephone numbers may be stored on speed dial buttons on telephone hand set 3, with holes 33 aligned directly over such speed dial buttons. While holes 33 are shown in the attached drawings as being generally circular, it will be appreciated by those skilled in the art that the holes could equally be of other shapes and could in fact be slots that expose and provide access to a number of pre-determined keys.

Figure 6:
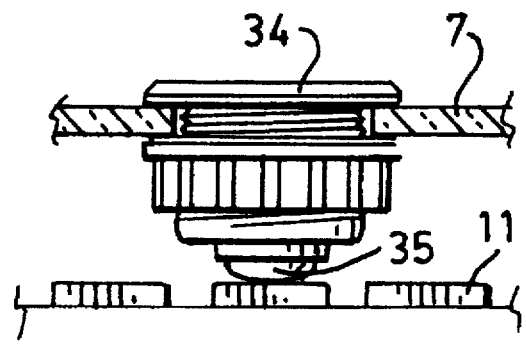
FIG. 6 is a sectional view taken along the line 6—6 of the device of FIG. 1; and, FIG. 7 is a sectional view taken along the line 7—7 of the device of FIG. 1.
Figure 7:
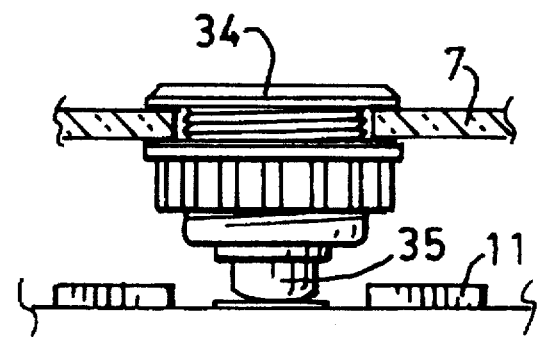

In an alternate embodiment, and as shown in FIGS. 1, 5 and 6, dialling means 10 may be comprised of a series of manually operable single activation plunger buttons 34 located in cover 7. Manually operable single activation plunger buttons 34 are similar in nature to plunger button 25 except that once released their plungers retract back upwardly into the button body. That is, the plungers 35 of buttons 34 only remain in their downward position when button 34 is depressed. Positioning plunger buttons 34 over pre-determined keys on telephone hand set 3 will therefore allow an operator to activate the pre-determined keys by depressing and then releasing the plunger buttons. Manually operable single activation plunger buttons 34 act in essentially the same fashion as holes 33 except that they remove the ability for an unauthorized individual to insert objects through the cover to activate adjacent keys.

It will be appreciated that telephone hand set security device 1 as described above, and as shown in the attached Figures, will not only provide a means to limit access to telephone hand set 3 but will also provide a means to protect the telephone hand set from impact and from dusty or dirty environments. For purposes of protection, and also to reduce the ability of unauthorized individuals to tamper with device 1, in the preferred embodiment cover 7 is comprised of a transparent, rigid, shatter resistant material. An example of such a material that has been found to perform adequately is Lexan™ by E.I. Dupont and Company. Other materials that may also be used include plexiglass, extruded plastics and tempered glass products. Where transparency is not of critical importance cover 7 could also be made from aluminum or other metals. Similarly, cabinet 2 may be comprised of a variety of different materials depending upon the application of device 1. Such materials include wood, metal, ceramic, and plastic. To reduce the built up of heat that may be given off by the telephone hand set, cabinet 2 preferably includes ventilation holes 36. Finally, in the embodiment that utilizes plunger buttons 34, the number of open holes in cover 7 will be reduced thereby providing an additional degree of protection from dust, water or impact from foreign objects.

It is to be understood that what has been described are the preferred embodiments of the invention and that it is possible to make variations to these embodiments while staying within the broad scope of the invention. Some of these variations have been discussed while others will be readily apparent to those skilled in the art. For example, while lock 9 has been described as having a bolt 14 that extends upwardly through slot 15, bolt 14 could equally be configured to extend through a ring or similar member that depends downwardly from cover 7.

I claim:

1. A device for limiting unauthorized access to a telephone hand set, the device comprising:

a cabinet for receiving and holding a telephone hand set having a receiver, a key pad, an off-hook switch and a cradle to hold the receiver, said cabinet having an enclosed bottom, enclosed sides and an open top;

a removable cover, said cover received into the open top of said cabinet, said cover having an open and a closed position, when in said closed position said cover sealing said open top of said cabinet to enclose and limit access to the key pad of the telephone hand set while providing unlimited access to the receiver of the telephone hand set, when in said open position said cover providing unobstructed access to the telephone hand set;

a lock to secure said cover in said closed position;

a pair of openings through said cover, said openings aligning with the cradle of the telephone hand set to allow for the reception of the receiver within the cradle and normal operation of the off-hook switch of the telephone hand set when said cover is in said closed position, said cover and said openings through said cover together providing a mean to support the receiver, independently from the cradle of the telephone hand set, when said cover is in said open position; and, dialling means in said cover to allow for the activation of predetermined keys on the key pad of the telephone hand set while said cover is in said closed position.

2. A device as claimed in claim 1 wherein said cover further includes means to allow for the placement of the receiver of the telephone hand set in an on-hook or off-hook position when said cover is in said open position.

3. A device as claimed in claim 2 wherein said cover is slidably received into said cabinet such that when said cover is in said closed position said cabinet holds said cover three sides thereof.

4. A device as claimed in claim 3 wherein said dialling means to allow for the activation of pre-determined keys on the telephone key pad when said cover is in said closed position comprises holes through said cover, said holes aligning with the pre-determined keys when said cover is in said closed position and allowing for the activation of only the pre-determined keys.

5. A device as claimed in claim 3 wherein said dialling means to allow for the activation of pre-determined keys on the telephone key pad when said cover is in said closed position comprises a series of manually operable single activation plunger buttons positioned in said cover, one of said buttons positioned over each of the pre-determined keys when said cover is in said closed position such that activation of a single activation plunger buttons caused the activation of a pre-determined key.

6. A device as claimed in claim 5 wherein said cabinet includes a stop to limit the removal of said cover therefrom and to facilitate in the fixing of said cover in said open position.

7. A device as claimed in claim 6 wherein said means to allow for the placement of the receiver in said on-hook or off-hook position when said cover is in said open position comprises a manually operable double activation plunger button positioned in said cover such that said double activation plunger button is positioned over the off-hook switch of the telephone hand set when said cover is in said open position.

8. A device as claimed in claim 7 wherein said double activation plunger button has an extended and a retracted position, when said cover is in said open position and said double activation plunger button is in said extended position said button engages the off-hook switch of the telephone hand set to maintain the telephone hand set in an on-hook configuration, when said double activation plunger button is in said retracted position said button releasing the off-hook switch of the telephone hand set thereby placing the telephone in an off-hook position.

9. A device as claimed in claim 8 wherein said lock includes a movable bolt that engages a slot in said cover to lock said cover in place.

10. A device as claimed in claim 9 wherein said cover includes handle means to facilitate in moving said cover from said closed to said open position.

11. A device as claimed in claim 10 wherein said cabinet includes a lower slot on its enclosed bottom to receive and hold said cover when said cover is removed from said top of said cabinet.

12. A device as claimed in claim 11 wherein said cover is transparent.

13. A device as claimed in claim 12 wherein said cabinet includes ventilation holes.

* * * * *